US011866132B2

(12) United States Patent
Kardas et al.

(10) Patent No.: US 11,866,132 B2
(45) Date of Patent: Jan. 9, 2024

(54) RETRACTABLE HULL MOUNTING DATA COLLECTING SYSTEM

(71) Applicant: Hobie Cat IP, LLC, Oceanside, CA (US)

(72) Inventors: Jason Christopher Kardas, Oceanside, CA (US); Drew William Brackett, Carlsbad, CA (US); William John Broadway, Oceanside, CA (US); James Taylor Czarnowski, Fallbrook, CA (US); Philip James Dow, Oceanside, CA (US); Elizabeth Catherine Sexton, San Clemente, CA (US); Shane Yellin, Carlsbad, CA (US)

(73) Assignee: Hobie Cat IP, LLC, Livonia, MI (US)

( * ) Notice: Subject to any disclaimer, the term of this patent is extended or adjusted under 35 U.S.C. 154(b) by 147 days.

(21) Appl. No.: 17/354,000

(22) Filed: Jun. 22, 2021

(65) Prior Publication Data

US 2022/0009603 A1 Jan. 13, 2022

Related U.S. Application Data

(63) Continuation of application No. 16/002,733, filed on Jun. 7, 2018, now Pat. No. 11,091,235.

(51) Int. Cl.

| | |
|---|---|
| ***B63B 49/00*** | (2006.01) |
| ***B63B 59/00*** | (2006.01) |
| *B63B 17/00* | (2006.01) |
| *G10K 11/00* | (2006.01) |

(52) U.S. Cl.

CPC .............. *B63B 49/00* (2013.01); *B63B 59/00* (2013.01); *B63B 17/0081* (2013.01); *B63B 2201/18* (2013.01); *G10K 11/006* (2013.01)

(58) Field of Classification Search

CPC ....... B63B 49/00; B63B 59/00; G10K 11/004; G10K 11/006

See application file for complete search history.

(56) References Cited

U.S. PATENT DOCUMENTS

| | | | |
|---|---|---|---|
| 204,770 | A | 6/1878 | Smith |
| 3,426,725 | A | 2/1969 | Gerhardsen |
| 3,484,066 | A | 12/1969 | Aunspaugh |
| 3,903,634 | A | 9/1975 | Miyame |
| 4,282,590 | A | 8/1981 | Wingate |
| 4,852,291 | A | 8/1989 | Mengo |
| 4,852,491 | A | 8/1989 | Holl et al. |

(Continued)

FOREIGN PATENT DOCUMENTS

| | | |
|---|---|---|
| CN | 201545161 | 8/2010 |
| CN | 202690608 | 1/2013 |

(Continued)

OTHER PUBLICATIONS

Hobie Cat Co., "H-Rail Overview", Jun. 18, 2014, retrieved on Jun. 15, 2017, retrieved from URL <"https://www.youtube.com/watch?v=roelE7NMNrk">, 21 seconds in to video.

*Primary Examiner* — Andrew Polay

(74) *Attorney, Agent, or Firm* — Fish & Richardson P.C.

(57) ABSTRACT

A watercraft mounting system that embodies a moving mounting platform and a protective hull cavity which provides protection, prevents damage and improves storage of data collection systems.

18 Claims, 9 Drawing Sheets

(56) References Cited

U.S. PATENT DOCUMENTS

| | | | |
|---|---|---|---|
| 5,007,612 A | 4/1991 | Manfre | |
| 5,353,263 A | 10/1994 | Pakker et al. | |
| 5,413,063 A | 5/1995 | King | |
| 5,526,765 A | 6/1996 | Ahearn | |
| 7,040,587 B2 | 5/2006 | Thompson et al. | |
| 7,117,771 B2 | 10/2006 | Whiteford | |
| 7,236,427 B1 | 6/2007 | Schroeder | |
| 7,395,775 B2 | 7/2008 | LaScala | |
| 7,433,268 B1 * | 10/2008 | Schroeder ............ | G10K 11/006 367/188 |
| 7,434,775 B2 | 10/2008 | Wilcox | |
| 7,437,775 B2 | 10/2008 | Reynolds | |
| 7,500,451 B2 | 3/2009 | Ingraham et al. | |
| 7,841,124 B2 | 11/2010 | Wegman | |
| 8,056,495 B2 | 11/2011 | Lemons | |
| 8,453,373 B2 | 6/2013 | Gordon | |
| 9,604,703 B2 | 3/2017 | Kardas et al. | |
| 2005/0102881 A1 | 5/2005 | Legendziewicz | |
| 2010/0271907 A1 | 10/2010 | Lindner et al. | |
| 2015/0144044 A1 | 5/2015 | Item | |
| 2017/0293022 A1 | 10/2017 | Andreis et al. | |
| 2018/0120431 A1 * | 5/2018 | Pelin ..................... | G01S 7/6263 |

FOREIGN PATENT DOCUMENTS

| | | |
|---|---|---|
| CN | 103090115 | 5/2013 |
| CN | 103144060 | 6/2013 |
| EP | 0997375 | 5/2000 |
| GB | 2127887 | 4/1984 |

* cited by examiner

RETRACTABLE HULL MOUNTING DATA COLLECTING SYSTEM

CROSS-REFERENCE TO RELATED APPLICATIONS

This application is a continuation application of and claims priority to U.S. application Ser. No. 16/002,733, filed on Jun. 7, 2018.

FIELD OF INVENTION

This invention relates to a data collection system on a watercraft.

BACKGROUND OF INVENTION

Underwater data collection is a very popular feature among fishing and recreational watercraft. The most common application of data collection is with digital devices like cameras and transducers. Transducers have been mounted to the bottom or transom of watercraft and ping a sonar signal down and read back the reflecting signal. U.S. Pat. No. 7,437,775 discloses a rail mounted system which may include a depth meter. Other rail mounted systems are disclosed in U.S. Pat. Nos. 4,852,491 and 7,841,124. In underwater data detection and collection using digital devices, the bounced back signal is recorded and translated to a screen display to give the screen displayed readings about things like water temperature, depth, underwater life and ground profiles. This invention provides a novel mounting system for these data collection devices on watercraft which is not subject to disruption or damage due to impact with submerged objects, or other external forces.

SUMMARY OF THE INVENTION

A protective cavity in the bottom of a watercraft hull, a moveable mounting platform adapted to carry data detection and collection devices releasably suspended from said cavity, said moveable mounting platform being coupled to spring supports which allows said moveable mounting platform when deployed to move on said spring supports in any direction with respect to the hull in response to external impact or force.

A watercraft having a protective cavity in the bottom of the hull, a moveable mounting platform adapted to carry data detection and collection devices releasably suspended within said cavity, said moveable mounting platform being coupled to spring supports which allows said moveable mounting platform when deployed to move on said spring supports in any direction with respect to the hull in response to external impact or force.

A protective cavity in the bottom of a watercraft hull, a static rim affixed to a lower extremity of said cavity, a moveable mounting platform adapted to carry data collection devices releasably suspended within said cavity above said rim and sized to be able to pass through said rim, spring supports adapted to cause said moveable mounting platform to move down to and project below said cavity when the said movable mounting platform is not suspended to thereby deploy said data collection devices while allowing said moveable mounting platform passively to move on said spring supports in any direction with respect to the hull in response to external impact or force.

A watercraft having a protective cavity in the bottom of the hull, a static rim affixed to a lower extremity of said cavity, a moveable mounting platform adapted to carry data collection devices releasably suspended within said cavity above said rim and sized to be able to pass through said rim, spring supports adapted to cause said moveable mounting platform to move down to and project below said cavity when the said movable mounting platform is not suspended to thereby deploy said data collection devices while allowing said moveable mounting platform passively to move on said spring supports in any direction with respect to the hull in response to external impact or force.

The foundation of the invention is a moveable mounting platform. The design of this system is a platform that acts as a universal mounting platform.

This moveable mounting surface or platform is attached to a static object, preferably a rim, via a spring-like system. In the case of the preferred embodiment of this invention, there is a surrounding static rim which is affixed to the hull that extends closely around the moveable mounting platform. This platform is pulled down from the rim in four places by a bungee cord system which provides full articulation.

The moveable nature of the mounting platform allows it to be suspended within the cavity and to be moved up actively with a retraction line. Upon release of the retraction line, the four-point spring loaded system, preferably bungee cord, allows the moveable mounting platform to move passively and articulate to any irregular forces or objects impacting the system. Mountable objects can include but are not restricted to:

a. Recessed down-scan transducers.

b. Side-scan transducers.

c. Cameras.

THE DRAWINGS

Turning to the drawings.

DESCRIPTION OF THE PREFERRED EMBODIMENTS

Figure 1:
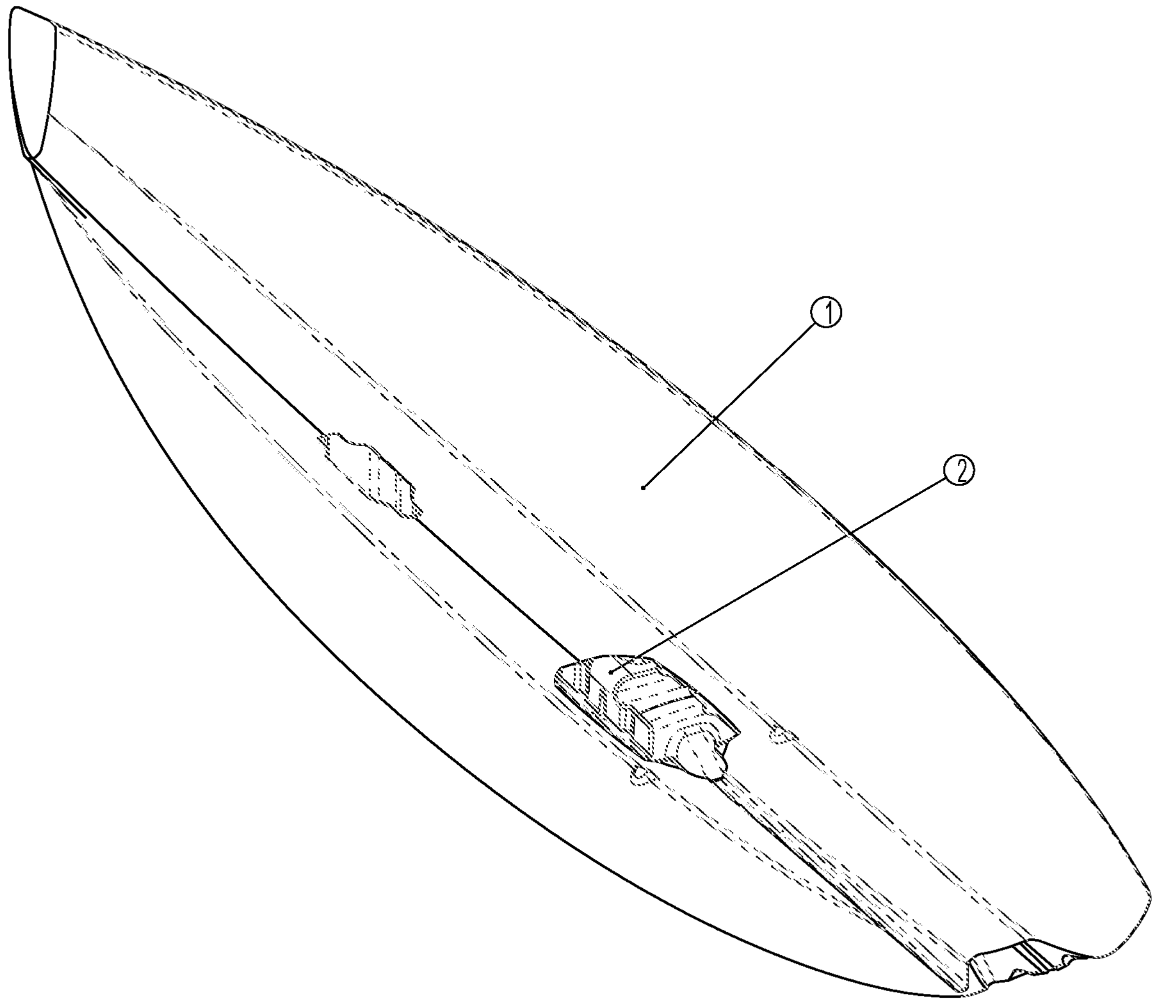
FIG. 1 is a perpendicular view of the hull shape of a watercraft and the recess cavity in the protective hull.

Turning to the drawings in more detail:

FIG. 1 illustrates the portion of the hull 1 having recess cavity 2 therein. The cavity allows for a protection area above the bottom of the hull.

Figure 2:
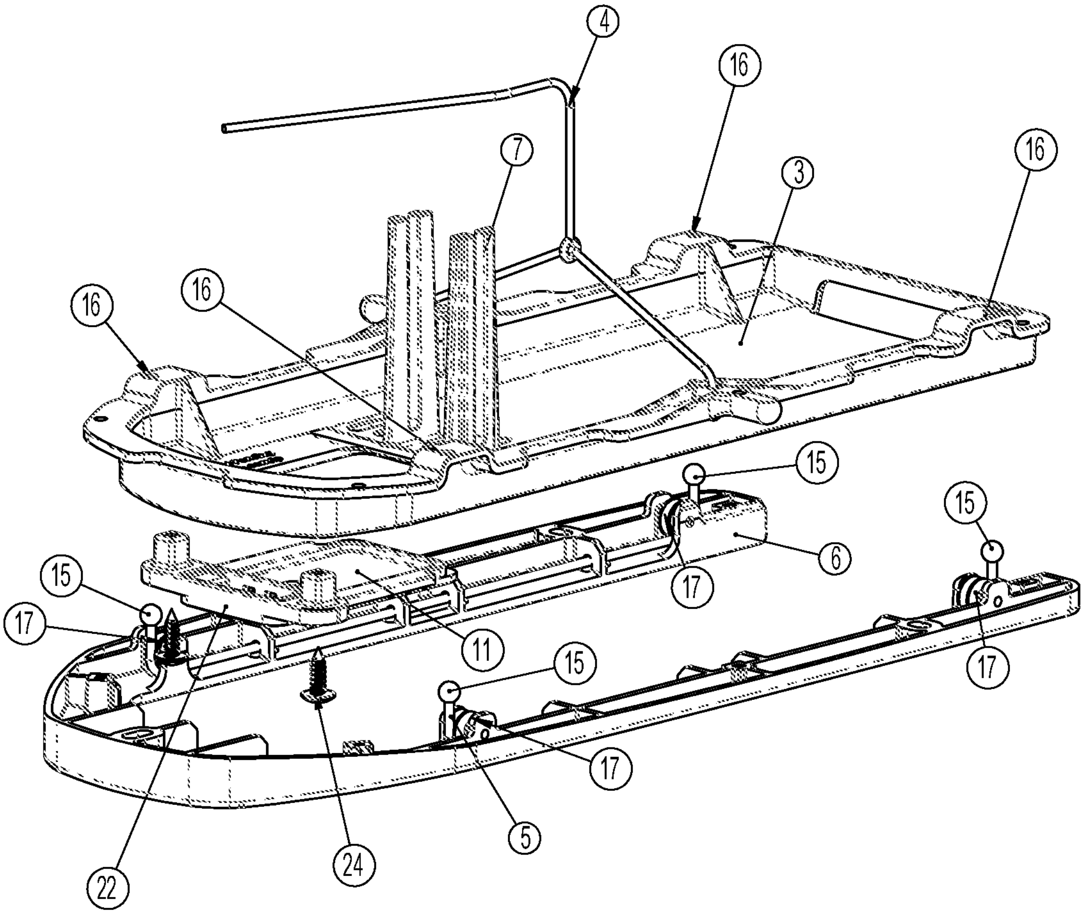
FIG. 2 is an exploded view of the assembly of the movable mounting platform and the fixed rim.
Figure 9:
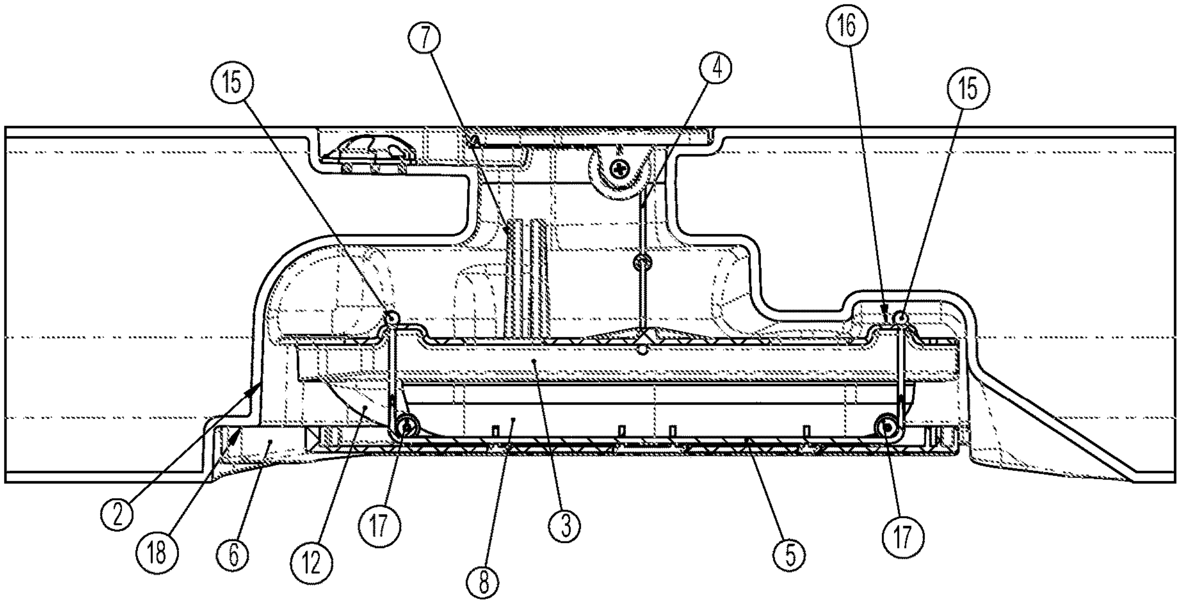
FIG. 9 is a side view of the hull in partial cutaway showing the moveable mounting platform retracted in the cavity and the pulleys and bungee cord.

FIG. 2 illustrates the assembly of the moveable plate 3 and outer rim 6. The assembly comprises a static outer rim 6 which is constrained by offset 18 in cavity 2. The outer static rim 6 contains a bungee cord 5 at each side. The spring force of each bungee cord 5 is attached at knots 15 at the four corners 16 of the mounting plate 3 as shown in FIG. 9. Each bungee cord 5 on rim 6 runs over pulleys 17 which allow for all angle articulation of the moveable mounting platform 3 when the moveable mounting platform is deployed upon release of the retraction cord 4.

Figure 4:
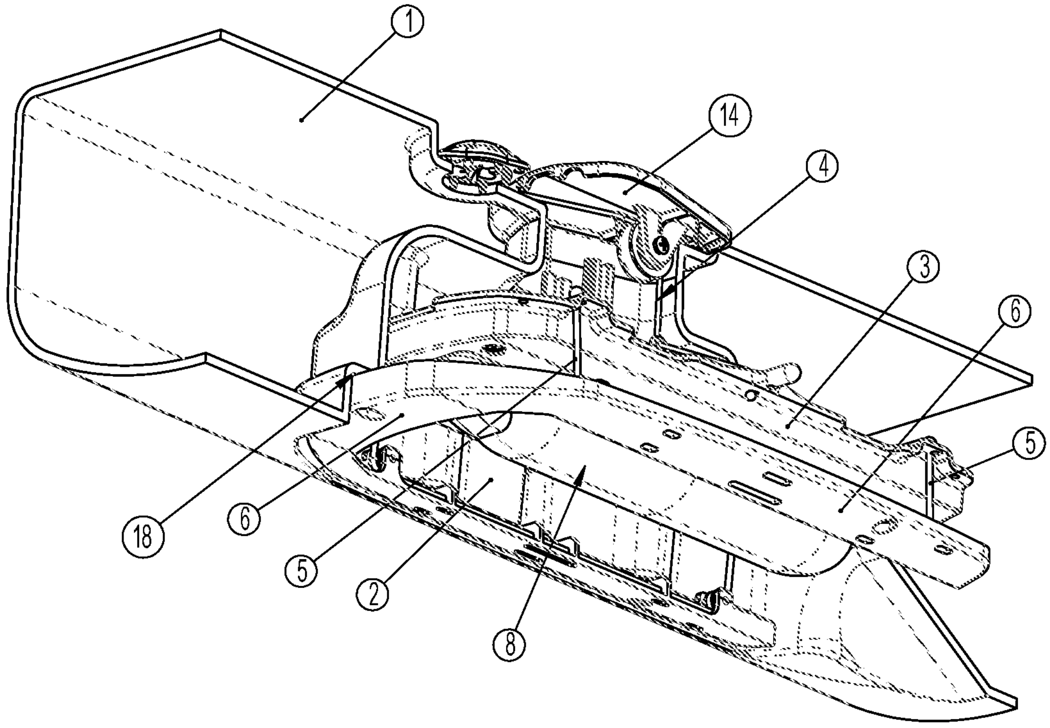
FIG. 4 is similar to FIG. 3, showing a segment of the hull and the moveable mounting platform with the side-scan transducer, the moveable mounting platform being in the raised or retracted position.
Figure 5:
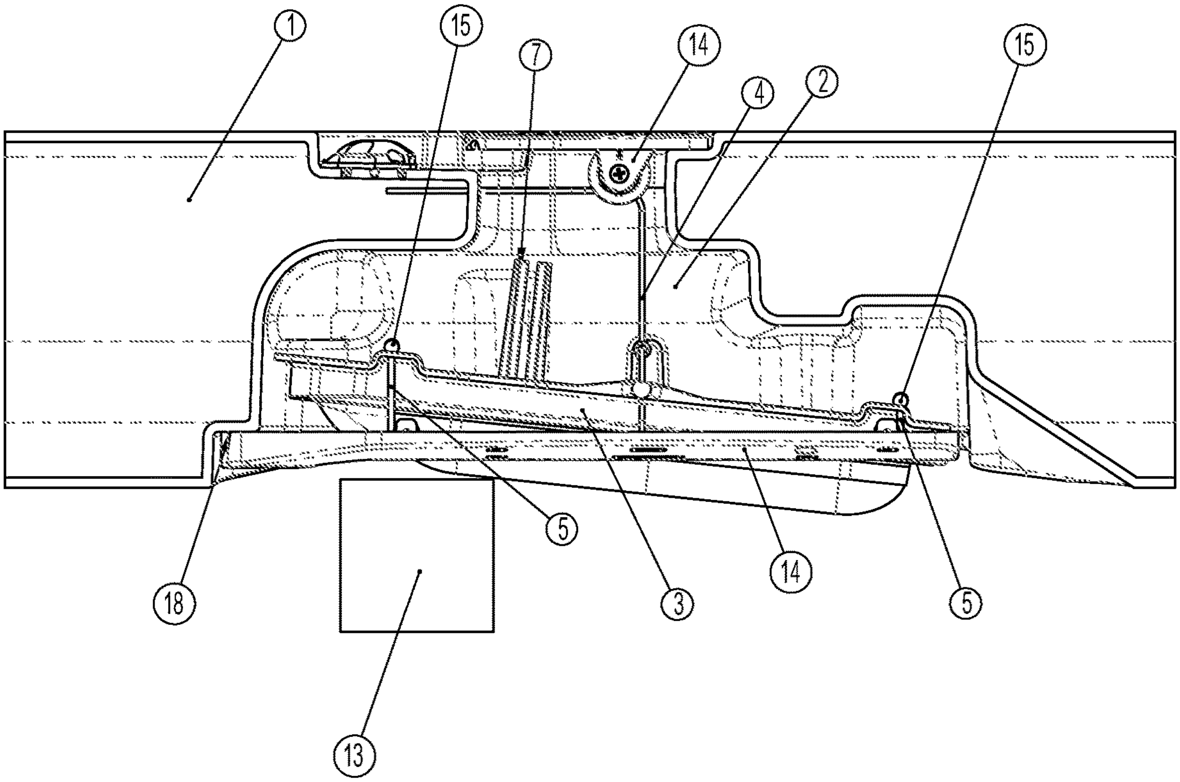
FIG. 5 shows the passive movement of the deployed moveable mounting platform with transducer, upon collision with a foreign object following release of the retraction line.

Each bungee cord 5 is stressed, that is, under tension so as to exert downward force on the moveable mounting plate 3, moving it down from the surrounding rim 6 during deployment. For retraction, the cord 4 is used to pull the moveable mounting platform 3 up in the cavity 3 and above rim 6 as shown in FIG. 4. The rim 6 is held in place against upward movement by the projection 18 in hull cavity 2. When it is desired to deploy the device carried on the moveable mounting platform 3, the retraction cord 4 is released or slackened. Each bungee cord 5 then pulls the moveable mounting platform down as shown in FIG. 5. The moveable mounting platform 3 is then free to articulate and angle in any direction while under the spring-like tension of the bungee cord 5.

Figure 3:
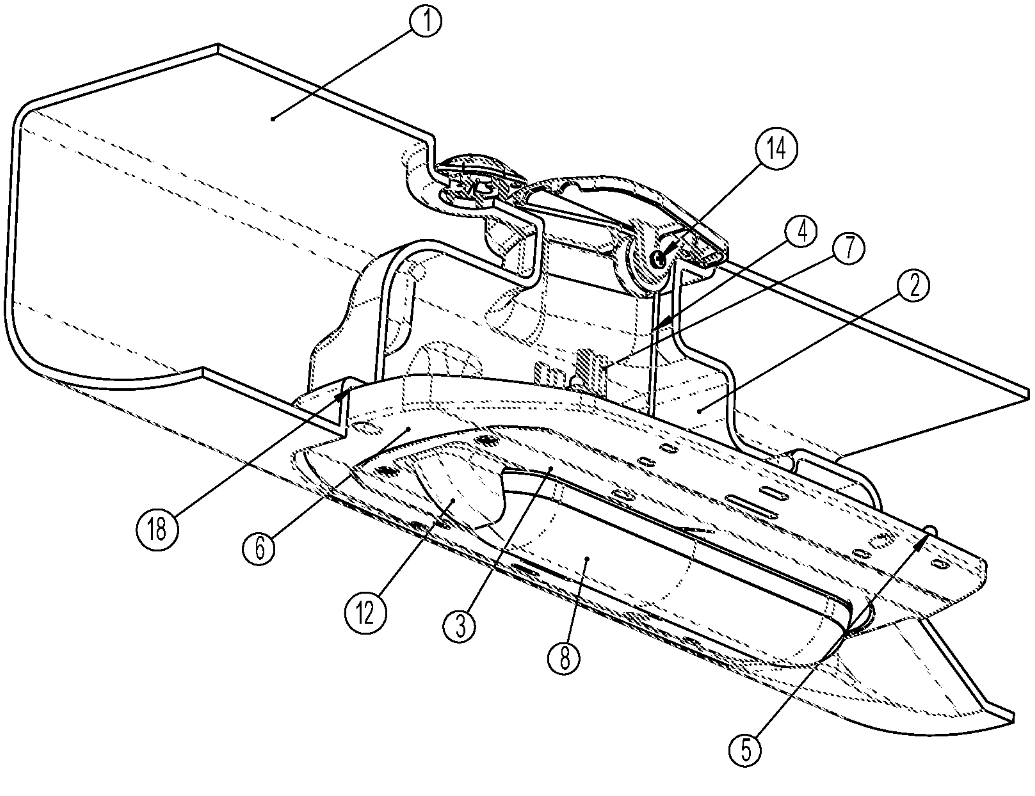
FIG. 3 is a view, with parts of the hull removed, taken from below and to the side of the hull showing a side-scan transducer mounted to the bottom of the moveable mounting platform with the platform being in the lowered or deployed position projecting from the protective cavity in the hull.

FIGS. 3 and 5 display a side-scan transducer 8 mounted to the bottom of the plate 3 when in the deployed position. The mounting plate 3 is sized so that it can pass through static outer rim 6 when upward tension on retraction cord 4 is released. When deployed the transducer 8 sticks proud of the bottom and is vulnerable to damage. In front of the transducer 8 there is a kick-up guard 12 to protect the transducer from impact with external objects.

FIG. 4 displays the mounting plate 3 and transducer 8 in the retracted position. The mounting plate 3 is actively retracted by upward tension on retraction line 4. The transducer is actively retracted by pulling on the retraction cord 4 which is directed around a pulley 14 and leads to a pull handle somewhere on the watercraft. The pull handle is operated manually. However, power operation of the retraction cord 4 is an obvious alternative. Note that in this position the side-scan transducer 8 is safely recessed in the cavity 2.

FIG. 5 illustrates the passive retraction feature. In the event of a collision with a foreign object 13, the mounting plate 3 will articulate over the obstruction into the cavity 2 without the need for use of the retraction cord 4.

Figure 6:
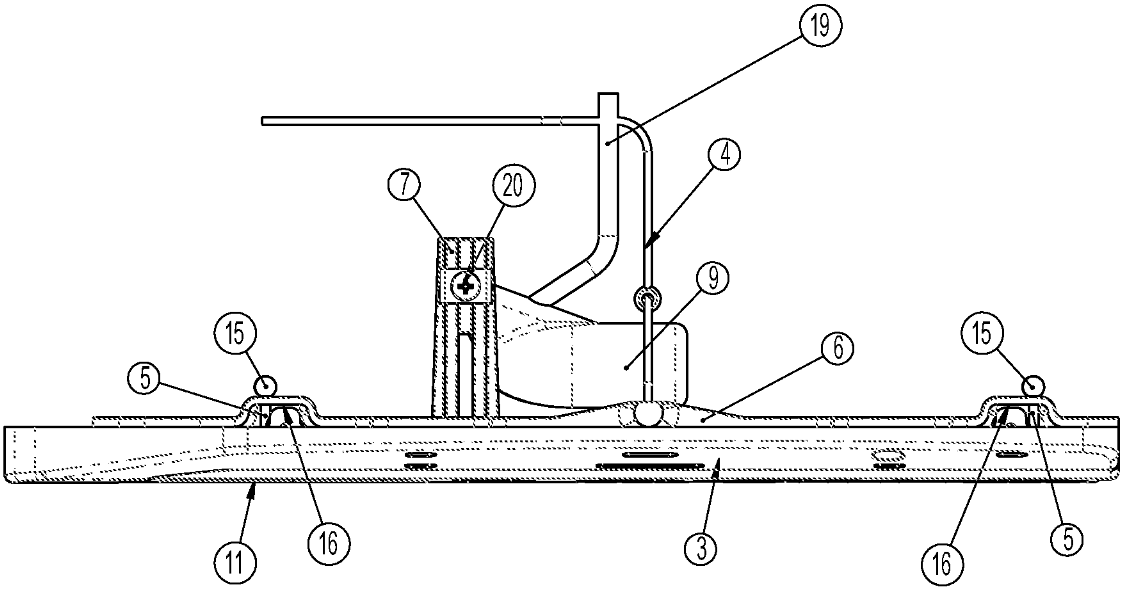
FIG. 6 shows the deployed moveable mounting platform carrying a down-scan transducer.
Figure 7:
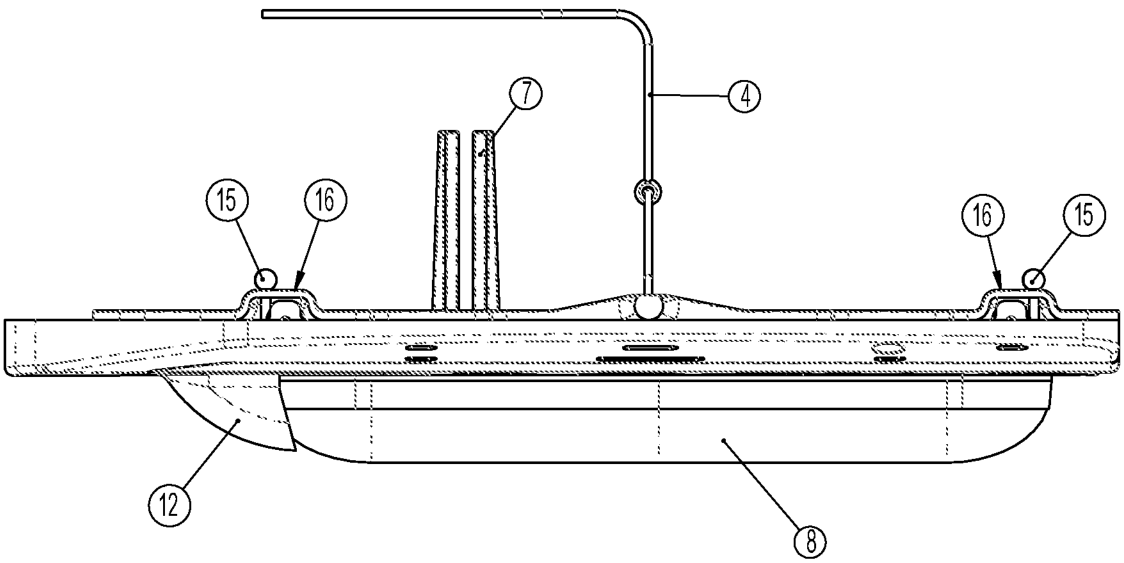
FIG. 7 shows the deployed moveable mounting platform carrying a side-scan transducer.
Figure 8:
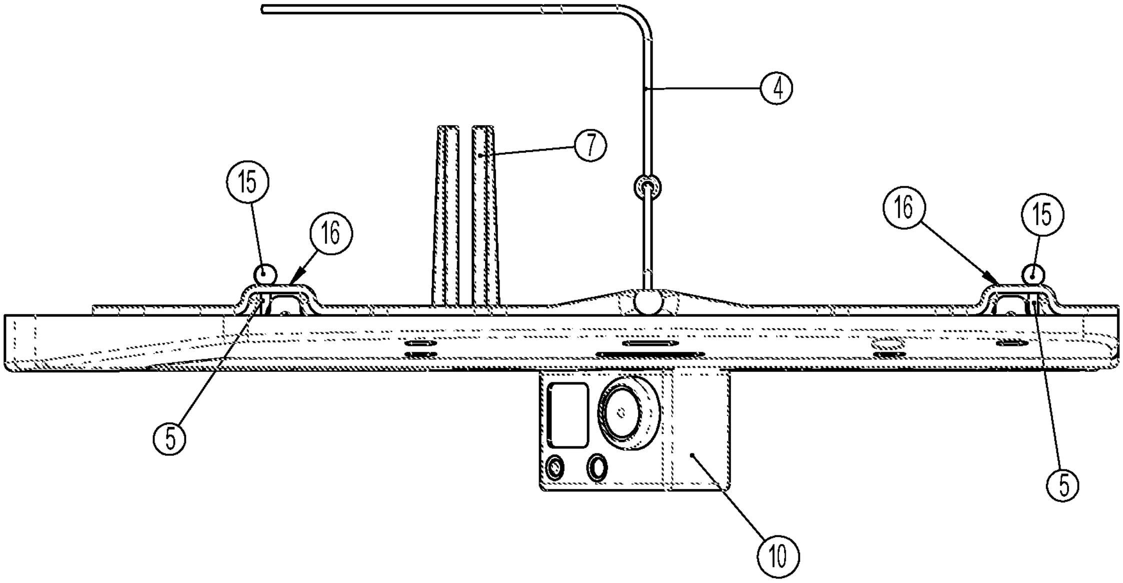
FIG. 8 shows the deployed mounting plate carrying a camera.

FIGS. 6 through 8 illustrate a variety of possible objects that could be mounted to the plate which include a down-scan transducer 9, side-scan transducer 8 and camera 10. In FIG. 6, the electric power for the transducer is provided via electrical connection 19.

The bungee cord 5 is used in the preferred embodiment to provide durability and corrosion resistance, but other spring systems (coil springs, rubber rod, leaf springs) creating down pressure on the mounting plate 3 can be used in this system.

As shown in FIG. 6, the optional mounting towers 7 can be joined to the down-scan transducer 9 by bolt or screw connection 20 to provide stability.

As shown in FIG. 2, the moveable mounting platform 3 can optionally have a removeable plate 11 which is connected to the main structure of platform 3 by member 22 which is attached by screws 24.

What is claimed:

1. A watercraft comprising:
- a hull;
- a cavity along a bottom portion of the hull;
- a mounting platform configured to carry a data collection system;
- one or more support members suspending the mounting platform within the cavity, wherein the one or more support members are configured to allow at least a portion of the mounting platform and the data collection system to retract into the cavity in response to an external force on the portion of the data collection system; and
- a retraction device connected to the mounting platform, the retraction device being manually operable to retract the mounting platform into the cavity, wherein the retraction device comprises a pull handle manually operable to pull a cord to retract the mounting platform into the cavity.

2. The watercraft of claim 1, wherein the one or more support members comprise a plurality of support members.

3. The watercraft of claim 1, wherein the one or more support members are one or more tension members.

4. The watercraft of claim 1, wherein the one or more support members are configured to apply a force on the mounting platform to move the mounting platform away from a top portion of the hull.

5. The watercraft of claim 1, wherein the one or more support members are configured to extend in response to the external force on the portion of the data collection system.

6. The watercraft of claim 1, wherein the one or more support members comprise:
- a first support member connected to a front portion of the mounting platform; and
- a second support member connected to a rear portion of the mounting platform.

7. The watercraft of claim 6, wherein the one or more support members comprise:
- a third support member connected to the front portion of the mounting platform; and
- a fourth support member connected to the rear portion of the mounting platform.

8. The watercraft of claim 6, wherein the first support member is configured to extend in response to the external force being on a front portion of the data collection system.

9. The watercraft of claim 8, wherein the mounting platform is configured to tilt in response to the external force being on the front portion of the data collection system.

10. The watercraft of claim 8, wherein:
- the external force is a first external force; and
- the second support member is configured to extend in response to a second external force being on a rear portion of the data collection system.

11. The watercraft of claim 1, further comprising:
- a rim fixed to the hull along a perimeter of the cavity, wherein the one or more support members extend between the rim and the mounting platform.

12. The watercraft of claim 1, further comprising the data collection system, wherein the data collection system comprises at least one of a down-scan transducer, a side-scan transducer, or a camera.

13. The watercraft of claim 1, wherein the cavity extends through an entire height of the hull.

14. A mounting assembly for a watercraft, the mounting assembly comprising:

a mounting platform configured to carry a data collection system;

one or more support members attached to the mounting platform, the one or more support members configured to suspend the mounting platform within a cavity of the watercraft, wherein the one or more support members are configured to allow at least a portion of the mounting platform and the data collection system to retract into the cavity of the watercraft in response to an external force on the portion of the data collection system; and a retraction device connected to the mounting platform, the retraction device being manually operable to retract the mounting platform into the cavity, wherein the retraction device comprises a pull handle manually operable to pull a cord to retract the mounting platform into the cavity.

15. The mounting assembly of claim 14, wherein the one or more support members comprise:

a first support member connected to a first corner portion of the mounting platform;

a second support member connected to a second corner portion of the mounting platform;

a third support member connected to a third corner portion of the mounting platform; and a fourth support member connected to a fourth corner portion of the mounting platform.

16. The mounting assembly of claim 14, wherein the one or more support members are configured to be stressed when the mounting platform is in a deployed position in which the data collection system projects downwardly from the cavity.

17. The mounting assembly of claim 16, wherein the one or more support members are configured to be further stressed in response to the external force on the portion of the data collection system.

18. The mounting assembly of claim 17, wherein:

the one or more support members comprise a front support member attached to a front portion of the mounting platform and a rear support member attached to a rear portion of the mounting platform; and the retraction device connected is to the mounting platform at a location between the front support member and the rear support member.

* * * * *